US007184041B2

(12) United States Patent
Heng et al.

(10) Patent No.: US 7,184,041 B2
(45) Date of Patent: *Feb. 27, 2007

(54) BLOCK-BASED FRAGMENT FILTRATION WITH FEASIBLE MULTI-GPU ACCELERATION FOR REAL-TIME VOLUME RENDERING ON CONVENTIONAL PERSONAL COMPUTER

(75) Inventors: Pheng-Ann Heng, Hong Kong (HK); Yongming Xie, Hong Kong (HK); Tien-Tsin Wong, Hong Kong (HK); Yim-Pan Chui, Hong Kong (HK)

(73) Assignee: The Chinese University of Hong Kong, Hong Kong (HK)

( * ) Notice: Subject to any disclaimer, the term of this patent is extended or adjusted under 35 U.S.C. 154(b) by 50 days.

This patent is subject to a terminal disclaimer.

(21) Appl. No.: 10/971,360

(22) Filed: Oct. 22, 2004

(65) Prior Publication Data
US 2005/0231504 A1   Oct. 20, 2005

Related U.S. Application Data

(63) Continuation-in-part of application No. 10/829,022, filed on Apr. 20, 2004.

(51) Int. Cl.
*G06T 15/00* (2006.01)
(52) U.S. Cl. .................................. 345/424
(58) Field of Classification Search ............... 345/419
See application file for complete search history.

(56) References Cited

U.S. PATENT DOCUMENTS

| 5,831,623 | A  |   | 11/1998 | Negishi et al. |        |
|-----------|----|---|---------|----------------|--------|
| 5,963,211 | A  | * | 10/1999 | Oikawa et al.  | 345/424|
| 6,144,383 | A  | * | 11/2000 | Lichtenbelt et al.| 345/419|
| 6,304,266 | B1 |   | 10/2001 | Li             |        |
| 6,407,737 | B1 | * | 6/2002  | Zhao et al.    | 345/424|
| 6,559,843 | B1 | * | 5/2003  | Hsu            | 345/421|
| 6,690,371 | B1 | * | 2/2004  | Okerlund et al.| 345/424|

(Continued)

FOREIGN PATENT DOCUMENTS

JP   2003-263651 A   9/2003

OTHER PUBLICATIONS

Zhang et al., "The Chinese Visible Human (CVH) datasets incorporate technical and imaging advances on earlier digital humans," *J. Anat.* (2004) 204, pp. 165-173.

*Primary Examiner*—Mark Zimmerman
*Assistant Examiner*—Andrew Yang
(74) *Attorney, Agent, or Firm*—Townsend and Townsend and Crew LLP (57) ABSTRACT

A computer-based method and system for interactive volume rendering of a large volume data on a conventional personal computer using hardware-accelerated block filtration optimizing uses 3D-textured axis-aligned slices and block filtration. Fragment processing in a rendering pipeline is lessened by passing fragments to various processors selectively in blocks of voxels based on a filtering process operative on slices. The process involves generating a corresponding image texture and performing two-pass rendering, namely a virtual rendering pass and a main rendering pass. Block filtration is divided into static block filtration and dynamic block filtration. The static block filtration locates any view-independent unused signal being passed to a rasterization pipeline. The dynamic block filtration determines any view-dependent unused block generated due to occlusion. Block filtration processes utilize the vertex shader and pixel shader of a GPU in conventional personal computer graphics hardware. The method is for multi-thread, multi-GPU operation.

18 Claims, 10 Drawing Sheets

U.S. PATENT DOCUMENTS 6,694,163 B1 * 2/2004 Vining .................. 600/407
6,771,262 B2 * 8/2004 Krishnan ............... 345/424
6,995,763 B2 * 2/2006 Gatti et al. ............ 345/424
2002/0190984 A1 * 12/2002 Seiler et al. ............ 345/424
2004/0066384 A1 * 4/2004 Ohba ................... 345/419

* cited by examiner

BLOCK-BASED FRAGMENT FILTRATION WITH FEASIBLE MULTI-GPU ACCELERATION FOR REAL-TIME VOLUME RENDERING ON CONVENTIONAL PERSONAL COMPUTER

CROSS-REFERENCES TO RELATED APPLICATIONS

This application is a continuation-in-part application of U.S. patent application Ser. No. 10/829,022 filed Apr. 20, 2004.

STATEMENT AS TO RIGHTS TO INVENTIONS MADE UNDER FEDERALLY SPONSORED RESEARCH OR DEVELOPMENT

NOT APPLICABLE

REFERENCE TO A "SEQUENCE LISTING," A TABLE, OR A COMPUTER PROGRAM LISTING APPENDIX SUBMITTED ON A COMPACT DISK.

Appendix A is provided as a pseudo source code listing of a computer program.

BACKGROUND OF THE INVENTION

This invention relates to manipulation of visual images from large and detailed datasets. The need for this invention grew out of projects related to creation and manipulation of visible human datasets of developed from visible human research (VHR) projects that have been ongoing in many countries for over a decade. The invention has particular application to computer assisted medicine and medical education, but its application is not limited to medical applications.

The present invention relates specifically to volume rendering of data. More particularly, the present invention relates to 3D-textured axis-aligned slices in volume rendering.

Volume rendering is a technique for directly rendering a field of 3D scalar samples without first fitting geometric primitives to the samples. Common methods of volume rendering include ray-casting, volume splatting, and 3D-texture mapping.

Geometric primitives refer to polygonal representation of points, lines or surfaces. In particular, polygonal representation of surfaces is generally done by using triangle-based meshes or NURBS. Ray-casting is a technique for direct volume rendering by emitting a ray from a viewpoint to every screen pixel and then accumulating sample values along the ray.

Volume splatting is a technique for texturing a terrain using high resolution localized tiling elliptical Gaussian disks which transits nonlinearly. Splatting makes heavy use of a computer graphics processor which is expected to render each triangle many times to combine textures in a frame buffer. This requires heavy use of fill-rate and tri-angle-rate.

Figure 1A:
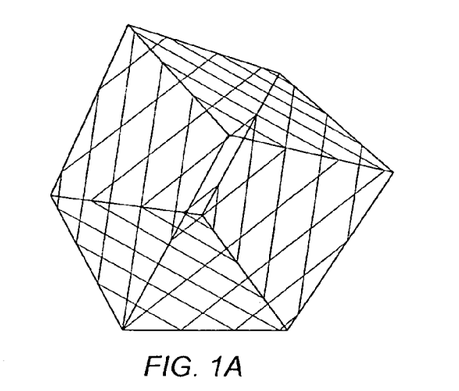
FIGS. 1A and 1B are an illustration of two types of 3D texture mapping (prior art).
Figure 1B:
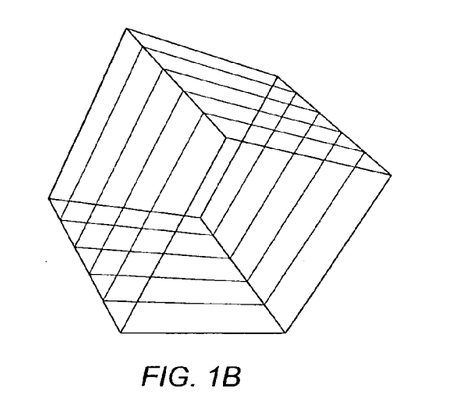

Referring to FIGS. 1A and 1B, there are the two different implementations of 3D-texture mapping, or 3D texturing through blending, which are other direct volume rendering techniques that utilize 3D texture memory on a graphics board: view-plane-aligned stacks of slices using 3D texturing (FIG. 1A) and axis-aligned stacks of slices using 3D texturing (FIG. 1B). Volume rendering techniques are of particular interest.

The overall work-flow of 3D texturing is as follows: Static signals are obtained from the original dataset; after having performed various texture threshold operations, volume picture elements or voxels of the volume data are initialized; then texture-mapped geometric primitives are rasterized into blocks of fragments based on the viewable region. Each such block has information on vertex and texture. Finally, blocks so obtained are handled by a conventional graphics pipeline.

The processing can be divided into three phases: vertex processing, rasterization and fragment processing.

1) Vertex Processing: The object of vertex processing is to process the point constructed from the volume dataset in the whole rendering process. The processing includes resizing, rotation, translation, spatial positioning or texture coordination of output points, and generating a color signal. In static volume rendering of a 512-by-512-by-512-point volume dataset, it takes four points for each slice, and hence it takes 2048 points in total.

Figure 2:
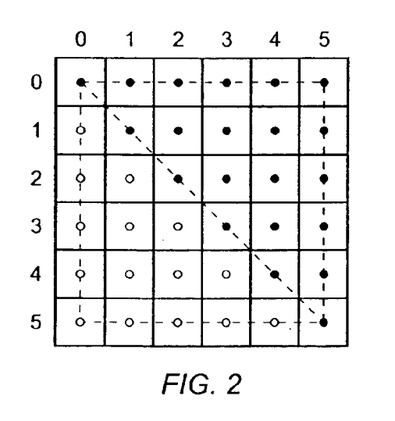
FIG. 2 is a matrix diagram of rasterization (prior art).

2) Rasterization: The object of rasterization is to transform geometric primitives into fragments expressible in a matrix including and above a main diagonal, as shown in FIG. 2. Each fragment is associated with depth, color and texture coordinate. Having initialized the volume dataset, the volume is rendered by a cumulative blending of a stack of slices. During rasterization, fragments are generated. For instance, if the volume is rendered orthographically, a 512-by-512-by-512-point volume dataset do generates 512 times 512 times 512 equals 134,217,728 fragments which demand a huge amount of rendering resource.

3) Fragment Processing: The object of fragment processing is to assign texture color to every fragment of the stack of slices. Since the texture is constructed from discrete units, extra processing, e.g. interpolation, is required to map a texture value onto each fragment. In cases when the edge of texture units is mapped onto the edge of a fragment, extra texture processing is required. Due to these calculations, texture mapping can be very computational intensive.

The basic idea of standard static 3D texturing is to render image onto a two-dimensional display by accumulating voxel values from a stack of texture mapped slices. Its advantage is simple in implementation and can be easily accommodated with current graphics pipeline techniques. Taking the known OpenGL 3D texturing kernel as an example, one need only initialize the volume texture from the dataset and initialize every vertex of the stack of slices. The rest of the work can be left to OpenGL's rendering pipeline.

Figure 3:
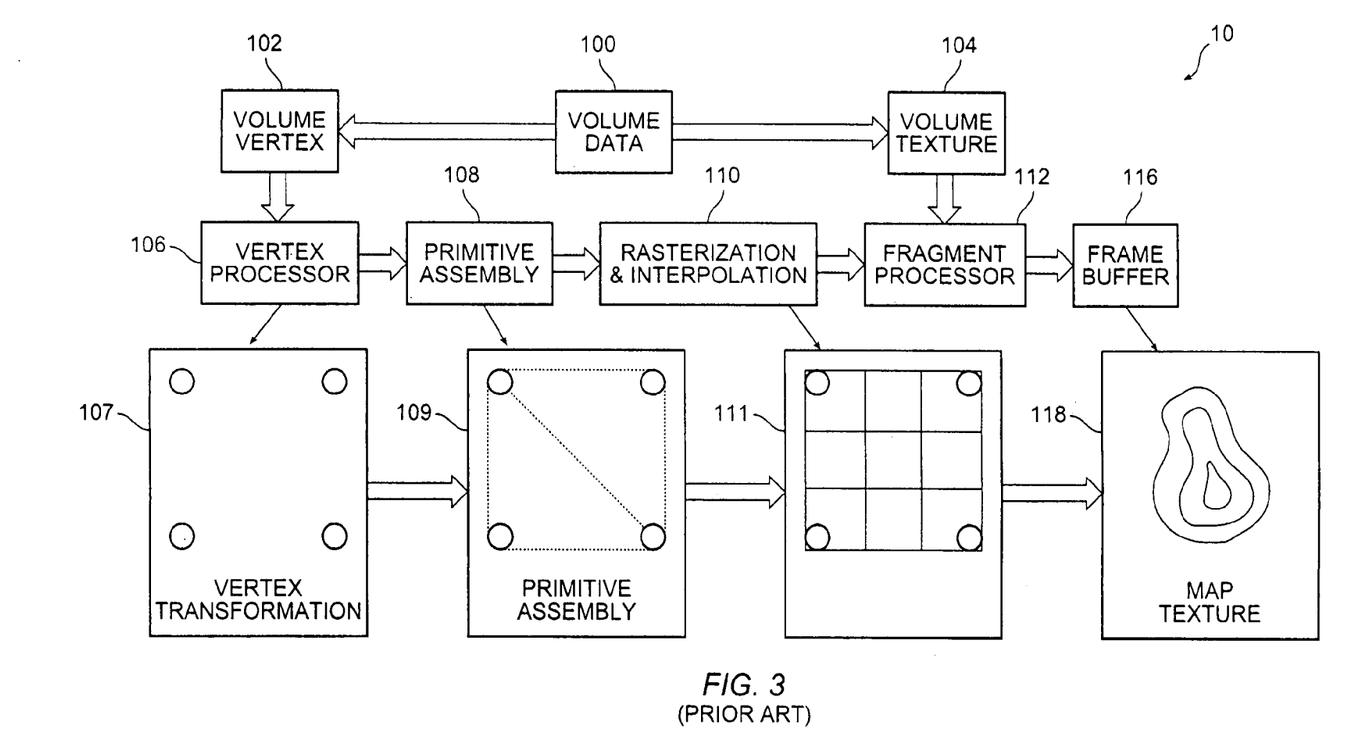
FIG. 3 is a process diagram of a rendering pipeline illustrating prior art static volume rendering.

FIG. 3 outlines the work-flow of prior art static volume rendering in a volume rendering system 10. It involves separating volume data 100 into volume vertex data 102 and volume texture data 104, processing the volume vertex data in a vertex processor 106 to obtain a vertex transformation 107, then processing the vertex transformation in a primitive assembly processor 108 to obtain a primitive assembly 109, applying a rasterization and interpolation processor 110 to obtain a rasterization 111, and processing the result with the volume texture data 104 in a fragment processor 112 where fragments are then assembled in a frame buffer 116 to yield a map texture output 118. Disadvantageously, this method requires the unused signals derived from the volume picture elements to always be passed along the rendering pipeline. Signals refer to a set of RGBA color entries. This leads to an inefficient use of hardware resources.

To maintain the completeness of the dataset, static signals are retained. In the data preprocessing phase, for datasets in common volume visualization applications, it has been determined that at least ten percentage of the static signals are unused, i.e., not used for final rendering. In addition, threshold control or other texture operations may generate new but non-contributing static signals. These unused signals are usually rendered with zero alpha value, in other words, fully transparent. Thus, keeping these unused signals can greatly degrade rendering performance.

In a real-time rendering phase, for a specific positional and orientational status of a dataset, occlusion due to preceding slices also generates unused signals. One of the common remedies is to reduce the number of slices rendered when the volume data is translated, rotated and rescaled. This enables the volume set to be moved or re-oriented smoothly, but at much lower visual quality.

One of the main factors lowering the volume rendering performance is the processing of huge amount of fragments during the rasterization phase. Since complicated computations in texture mapping must be performed on every fragment, the number of fragments that are processed can readily exhaust the texture memory. Thus, rendering very large datasets using static volume rendering has been infeasible on a conventional consumer-grade personal computer.

What is needed is a method and a system for rendering very large datasets of graphics data that is better suited to use of a conventional consumer-grade personal computer.

SUMMARY OF THE INVENTION

According to the invention, a computer-based method and a system are provided for interactive volume rendering of a large volume dataset on a conventional personal computer using hardware-accelerated block filtration optimizing the usage of graphics resources operating on 3D-textured axis-aligned slices. The burden of fragment processing in a rendering pipeline is lessened by a filtering process involving passing fragments of data through various processors selectively in blocks of volume picture elements or voxels. Specific techniques are disclosed.

The overall volume rendering reconstruction according to the invention comprises the following steps: processing slices to remove irrelevant information; reconstructing a 3D texture map from processed slices; carrying out essential transformations by vertex processor operations; subdividing the slices into grids of blocks specifying the corresponding depth and texture coordinate information; performing a two-pass rendering process, namely a virtual rendering pass and a main rendering pass, to process blocks; and using the fragment processor to project textured blocks and render final images. The block filtration process is divided into static block filtration and dynamic block filtration. The static block filtration locates any unused signals being passed to the rasterization pipeline; The dynamic block filtration determines any unused block generated due to occlusion. Block filtration processing utilizes the vertex shader and the pixel shader of the graphics processing unit (GPU) in the graphics hardware of a conventional personal computer. These shaders are the programmable points, including vertex processing and fragment processing, of the graphics pipeline. The method is designed to be operated in a multi-thread, multi-GPU manner.

The invention will be better understood by reference to the following detailed description in connection with the accompanying drawings.

DESCRIPTION OF SPECIFIC EMBODIMENTS OF THE INVENTION

According to the invention, the burden of fragment processing in the rendering pipeline is lessened by selectively passing the fragments to various processors for specialized processing. Instead of a batch processing of separate voxels/fragments, blocks of fragments are processed. This selective fragment processing is herein called Block-based Fragment Filtration.

Figure 4A:
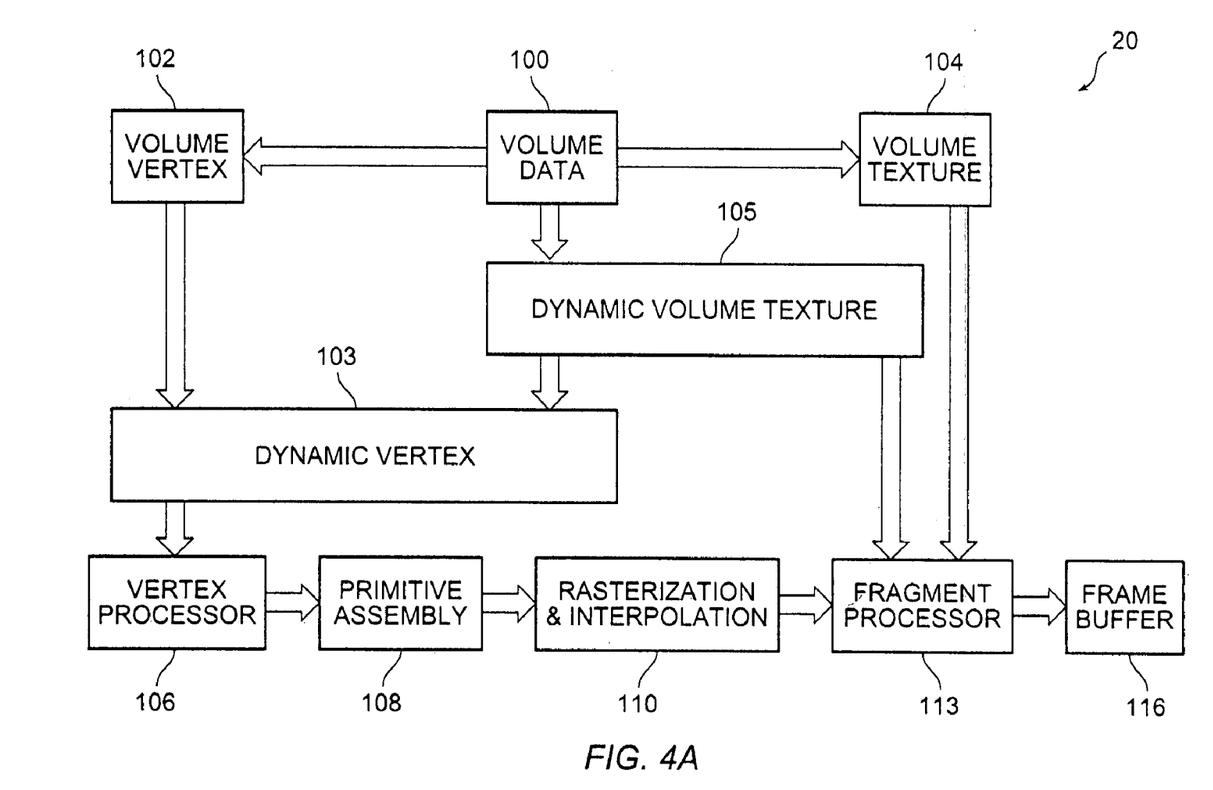
FIG. 4A is a process diagram of a rendering pipeline according to the invention.

FIG. 4A shows a volume rendering pipeline 20 according to the invention. Its differences compared to the prior art processor 10 (FIG. 3) will be apparent. The aim is to reduce the number of fragments being passed to a vertex processor 106 and to an augmented fragment processor 113, which differs some from that of the prior art to conform with the present invention. The volume data is separated into a volume vertex element 102 and a volume texture element 104, as well as a dynamic volume texture element 105. The volume vertex element 102 is converted to a dynamic vertex element 103, the output of which is supplied to the vertex processor 106 along with the output of the dynamic volume texture processor 105. The fragment processor 113 receives as input the output of the rasterization and interpolation processor 110, the dynamic volume texture element 105 and the volume texture element 104 to provide input to the fragment processor 113. As explained, the inventive method and a system operative according to the inventive method not only increase the rendering performance but also relieve hardware texture limitations. This method aims at avoiding processing the unused fragment or the unseen fragment. To this end, the invention provides dynamic volume rendering. In addition, the inventive method can be adapted to multi-GPU processing. Based on the number graphics processors installed on the PC, multiple threads can be distributed among these GPUs to render the volume dataset. The fragment filtration according to the invention enables interactive volume rendering of large volume dataset on a conventional or consumer-grade personal computer.

Figure 4B:
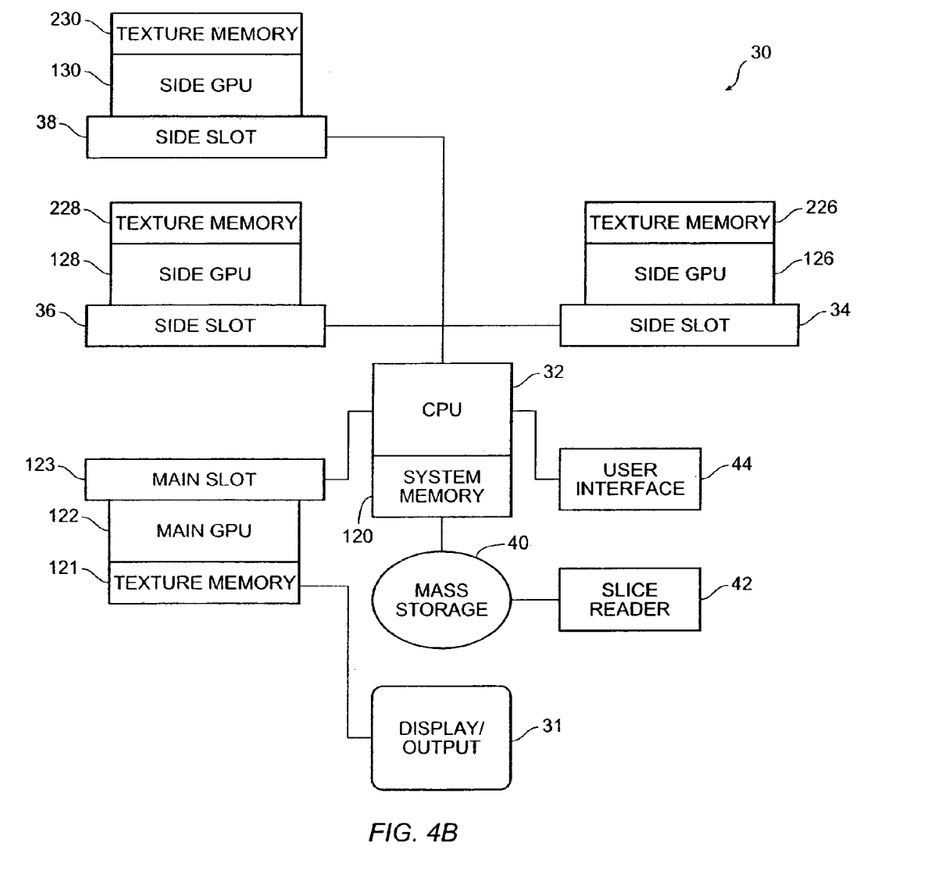
FIG. 4B is a block diagram of a system operative according to the invention.

FIG. 4B is a block diagram of a system operative according to the invention. The system is built upon the foundation of a conventional personal computer 30 having a display 31, a central processing unit (CPU) 32, system memory 120, a first or main graphics processing unit (GPU) 122 in a main slot 123, associated texture memory 121, a plurality of add-on GPUs 126, 128, 130 in side slots 34, 36, 38 coupled to the main slot 123, each GPU with associated texture memory 226, 228, 230, mass storage 40, a slice reader 42 operative to load a stack of texture slices into the system memory 120 for pre-processing, and a user interface 44 operative to accept user control input to translate, to rotate, to scale, and to specify a clipping-plane of the volume data.

Figure 4C:
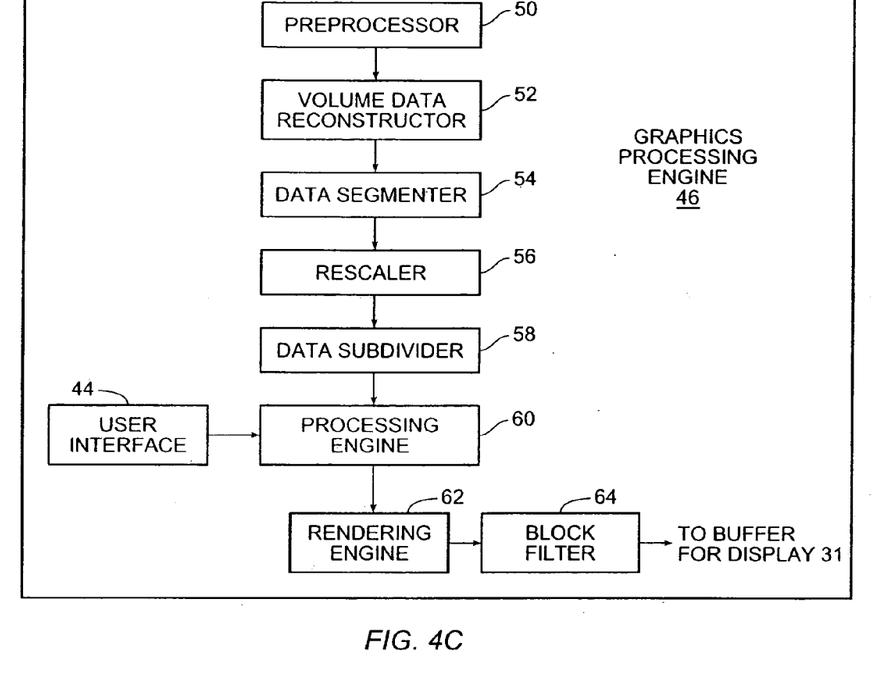
FIG. 4C is a block diagram in greater detail of a system including a graphics processing engine according to the invention.

FIG. 4C is a block diagram of the system including a graphics processing engine 46 according to the invention. The graphics processing engine 46 is the tool incorporated into the personal computer that is used for interactive volume rendering of the substantial amounts of volume data into displayable images on the display 31 of the personal computer 30, which is equipped with GPUs 122, 126, 128, 130, etc. The graphics processing engine 46 includes a pre-processor 50 for pre-processing each slice of the stack to remove irrelevant signals, a volume data reconstructer 52 for reconstructing a 3D texture map of the volume data from original 2-dimensional slices, a data segmenter 54 for segmenting the graphical data into 3 stacks of 2-dimensional-textured axis-aligned slices as hereinafter illustrated, a rescaler 56 for rescaling the image texture so that the edge dimension is of an integer power of two, a 2-dimensional data subdivider 58 for subdividing each 2-dimensional slice into a grid of smaller texture blocks, the internal side of the user interface 44 for receiving and requesting response to interactive input designating view and size of image display performed on the volume data, a processing engine 60 for carrying out selected transformations, including at least translation, rotation and scaling, on the volume data, and a rendering engine 62 for performing a two-pass rendering process on the blocks. According to the invention, the rendering process comprises a virtual rendering pass in order to compute view-dependent unused blocks, and a main rendering pass in order to obtain processed blocks for further filtration. Further according to the invention is a block-based fragment filter 64 operative on the processed blocks to obtain image elements suited for display as textured blocks and to output rendered final images.

A. Fundamental Hypotheses

Embodiments of the present invention rely on two fundamental hypotheses. The first fundamental hypothesis is that a large number of fragments tend to be wasted in the traditional processing of volume rendering. Thus, according to the present invention, a customized volume rendering pipeline is utilized to filter out, i.e., eliminate from processing, those unnecessary fragments. The second fundamental hypothesis is that the use of multiple graphics processor can provide a more robust volume render procedure. According to the invention a multi-threading scheme is used for distributing different phases of volume rendering among a number of graphics processors.

B. Customizing the Volume Rendering Pipeline

According to the invention, a system and computer-based method is provided for interactive volume rendering of large volume data on a conventional personal computer using hardware-accelerated block filtration. The method is based on 3D-textured axis-aligned slices. The volume rendering method employs the following steps: processing slices to remove irrelevant information; reconstructing 3D texture map from processed slices; carrying out essential transformations by vertex processor operations; rendering the volume in a two-pass manner: a virtual rendering pass and a main rendering pass; discretization of each slice into blocks of fragments which include the corresponding depth and texture coordinate information; and using a fragment processor to render a final image.

Figure 5:
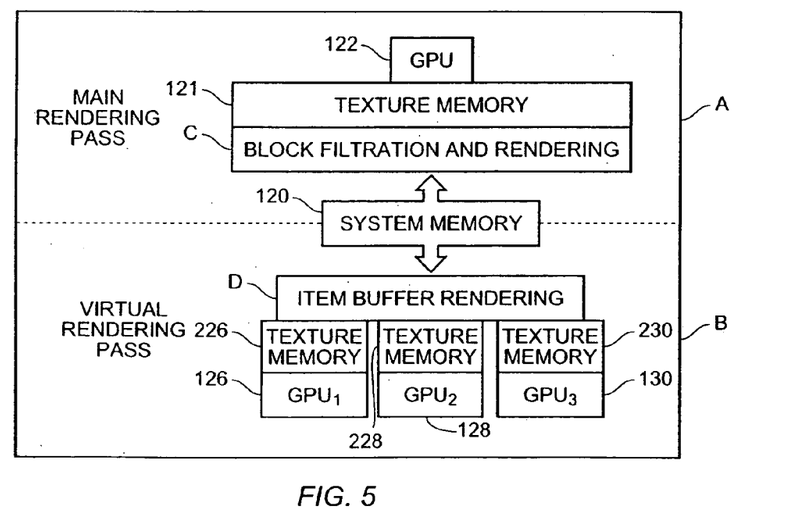
FIG. 5 is a flow chart of an overview of a volume rendering pipeline process according to the invention.

FIG. 5 shows an overview of the rendering process. The two passes are run in different threads, a main rendering pass A and a virtual rendering pass B. The virtual rendering pass aims at computing the visibility information through a modified item buffer rendering. Visibility information refers to the item being rendered in this modified item buffer, namely, a virtual rendering item buffer. The main rendering pass performs block filtration by the visibility information obtained and displays final images. In the main rendering pass A, data from system memory 120 of the personal computer subjects the data to block filtration and rendering C and stores its output in texture memory 121 for the associated GPU 122. In the virtual rendering pass B, the system memory 120 provides data that is subjected to item buffer rendering D the output of which is provided to texture memory 226, 228, 230 that supports numerous GPUs, 126, 128, 130, and so forth.

Figure 6:
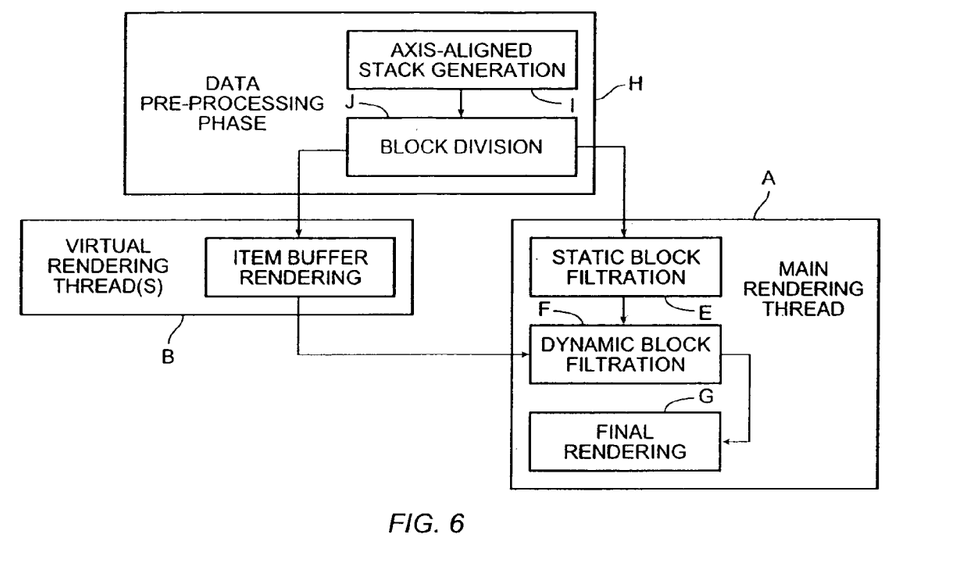
FIG. 6 is a flow chart of a portion of a method according to the invention.

Referring to FIG. 6, block filtration of the main rendering pass A is further divided into two phases: static block filtration E and dynamic block filtration F. The static block filtration E determines any unused static signal on every single texture slice (grid of blocks). The dynamic block filtration F determines any unused blocks generated due to occlusion, where occlusion details are computed in the virtual rendering pass B. The present method utilizes the vertex shader and pixel shader features available in a typical GPU of a conventional personal computer. The graphics hardware is used to filter out any unused blocks determined in the virtual rendering. FIG. 6 shows the flow of these steps. After data preprocessing (Step H) (including axis-aligned stack generation I and bock division J), static block filtration E and item buffer rendering B can be executed in parallel. Meanwhile, the item buffer rendering B can be further sub-divided into separate concurrent tasks (of which this is a single example), each of which is in a single thread allocated into different graphics processors.

C. Volume Data Preprocessing

Figure 14:
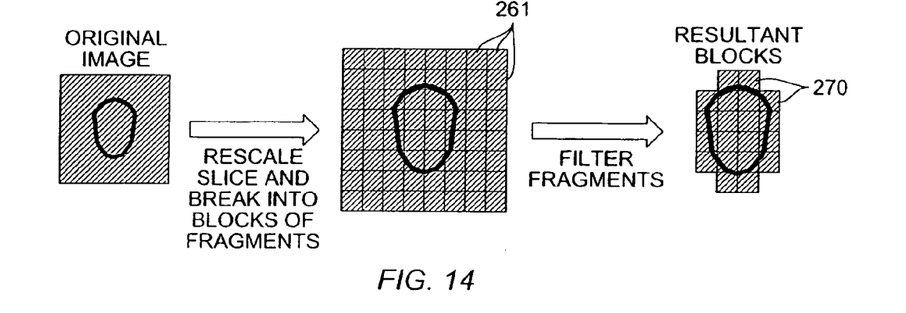
FIG. 14 is a depiction of results of a static block filtration example.

The task according to the invention involves volume data processing wherein for a stack of raw slices, each slice is divided into blocks of fragments. For the sake of efficient computation, the dimension of every block is limited to $2^n \times 2^n$, where n is a positive integer. Every block (elements of 338 or 340 or 342, FIG. 7) is labeled with an index for future reference. Vertex coordinates and corresponding texture coordinates of every block are stored. To maintain consistency between the dimension of a block and that of its slices, the slice's edge dimension is rescaled to an integer power of two (FIG. 14). For a, b and c as positive integers, rescaling the dimension of every x-axis-aligned slice to $2^b \times 2^c$, that of every y-axis-aligned slice to $2^a \times 2^c$, and that of every z-axis-aligned slice to $2^a \times 2^b$. For the block dimension, n is selected as a ratio k:n, where k is an integer and k=min(a, b, c) FIG. 14 illustrates how the slices are rescaled. As an example, consider the size of the original dataset is 120×120×60. By setting a=7 for the x axis, b=7 for the y axis, c=6 for the z axis (not shown in FIG. 14), the dimension of the dataset is thus resized to 128×128×64. In this case, k is equal to 5 while n can be set as 5 or less than 5. The choice of slice-to-block ratio depends on the hardware resource. This will be described after a discussion of the overall procedure.

Figure 7:
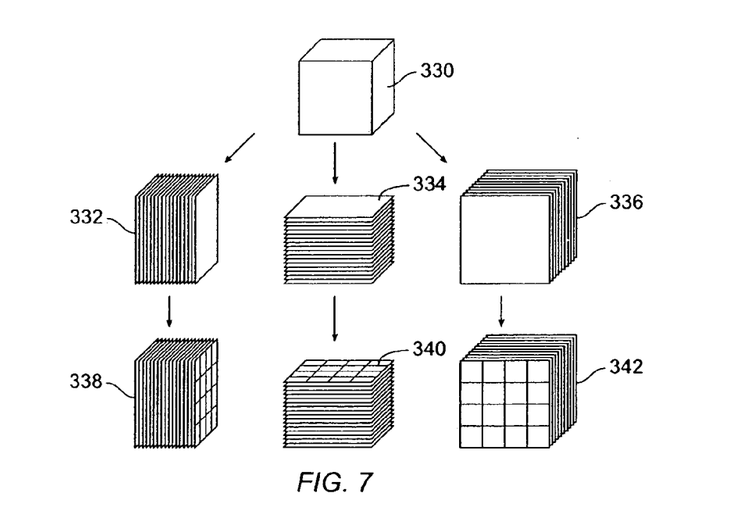
FIG. 7 is an illustration of a segmenting and subdividing step for axis-aligned stacks.

FIG. 7 outlines how stacks of axis-aligned slices in three separate directions are generated (Process K). For one particular data set, the preprocessing is carried once and thus it does not affect the performance of real-time rendering. However, the size of a regular block does affect the performance of later block filtration processes. Vertex coordinates and texture coordinates of every block are recorded (represented by a 3D block 330). Because volume rendering is based on 3D-textured axis-aligned slices, it is necessary to generate three separate axis-aligned stacks of slices 332, 334, 336. As mentioned, the dimension of any edge is limited to a power of two. A 3D texture map is reconstructed for each stack, which can be viewed as a 3D array of voxel values, from the original deck of slices. Making use of the 3D texture map, the other two stacks can be generated by linear interpolation of voxel values. Thus, three stacks of slices are divided into blocks separately. In other words, three individual sets of blocks 338, 340, 342 are retained.

D. Virtual Volume Rendering Pass

A virtual volume rendering pass (Process L) is performed in advance of final rendering. The aim of this pass is to pre-compute the visibility information so that the fragment processor can make use of this information to filter out unseen and thus unnecessary blocks of fragments. This pass can be executed in a separated thread, but it shares the same truck of system memory of which the main rendering thread make use.

Figure 8:
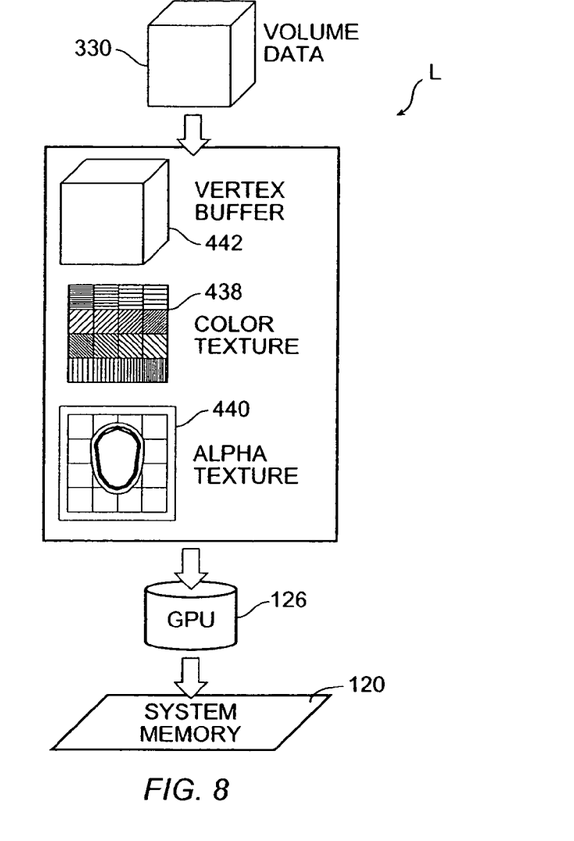
FIG. 8 is a flow diagram illustrating virtual volume rendering

Referring to FIG. 8, for every frame to be rendered, according to the current relative translational and rotational status of the volume dataset 330, which is captured to a vertex buffer 442, the corresponding axis-aligned stack out of the three (332, 334, 336 in FIG. 7) is determined and retrieved as the set of vertex information as stored in the arrays of the vertex buffer 442. If any axis-aligned or arbitrary clipping planes exist, they are set up accordingly and the combined texture is rendered to a virtual screen as if rendered in a conventional procedure. The items rendered in the virtual screen buffer represent all viewable blocks of the current frame.

A modified item buffer method, called a block buffer, is used to store a block's identity (ID) as color texture 438. This identity, which is computed from the index of the block, consists of the slice number, x-position, and y-position of the block. In other words, the ID of every block is determined in terms of a Cartesian (X, Y, Z) entry (FIG. 9), starting from (0, 0, 0). Every spatial ID is assigned to a (R, G, B) entry for the use of virtual rendering.

Figure 9:
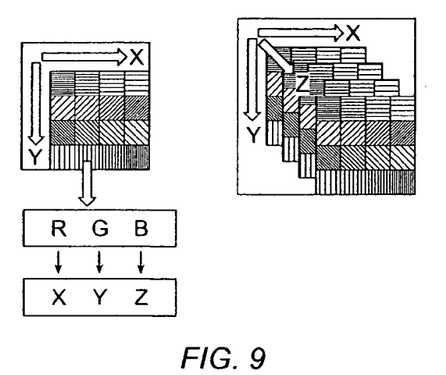
FIG. 9 is a diagram illustrating item buffer storage.

FIG. 9 illustrates the concept of a customized block buffer approach. Usually, a graphics Applications Program Interface (API) provides two options in a storage image, i.e. 16-bit storage or 32-bit storage. Here two policies are applied to different image storage formats. The image format is in either 16-bit or 32-bit format, for storing the block IDs. The information to be stored differs. If the image format is 16-bit, all bits are allocated as color texture, with the distribution of 5-6-5. If the image format is 32-bit, 24 bits are allocated as 8-8-8 color texture and the remaining 8 bits are left for a dummy luminance channel.

Figure 10:
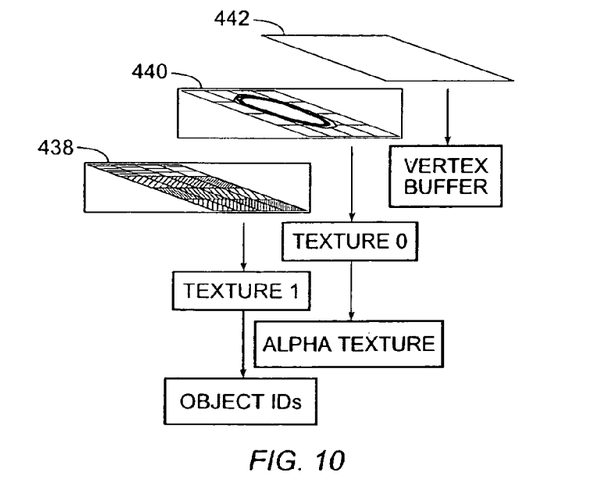
FIG. 10 is a diagram illustrating components of virtual rendering.

FIG. 10 illustrates the three components in the virtual rendering pass: Color texture 438, alpha texture 440 (if any) and vertex buffer 442.

Figure 11A:
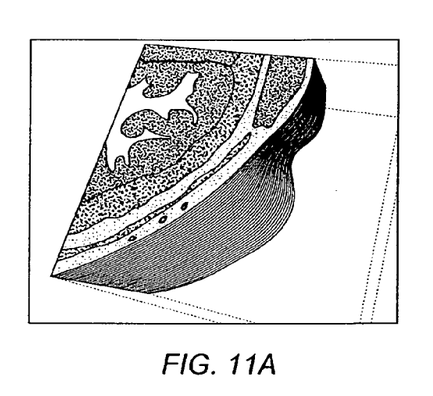
FIGS. 11A and 11B illustrate an example of main volume rendering and a virtual volume rendering.
Figure 11B:
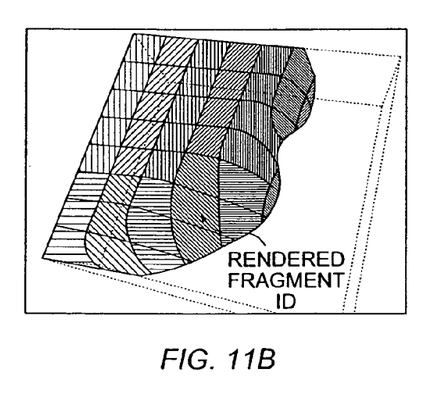

FIGS. 11A and 11B illustrate an example on how the virtual rendering pass is performed. FIG. 11A shows an example of actual rendering while FIG. 11B demonstrates the corresponding virtual rendering. The virtual screen buffer stores the information of blocks that should be displayed on screen. The virtual rendering is performed offline and there is no need to really render onto a screen as illustrated in FIG. 11B. In other words, the virtual buffer is never on screen. From the virtual buffer, blocks that are to be retained are determined and their ID is copied to the system memory. These block IDs will be used in the main rendering.

In the virtual rendering pass, a multi-GPU scheme can be used so that multiple vertex shaders and fragment shaders are utilized to obtain the visibility information in parallel. In particular, multiple side graphics slots are used in a conventional personal computer to achieve the parallelization. The number of available side graphics slots determines how many GPUs used in the virtual rendering. For "p" side graphics slots, divide the stack of texture slices (grids of blocks) into "p" different sets. Each single set of slices is rendered to one individual virtual screen. After all sets of slices are virtually rendered, the overall visibility information can be merged. Block IDs are copied to main system memory and are used in later dynamic block filtration.

E. Main Volume Rendering Pass

The main volume rendering pass filters unused blocks and renders final images. The block filtration comprises two steps:

static block filtration, in which view-independent non-contributing blocks are filtered out; and dynamic block filtration, in which view-dependent non-contributing blocks due to occlusion are filtered out.

Figure 12:
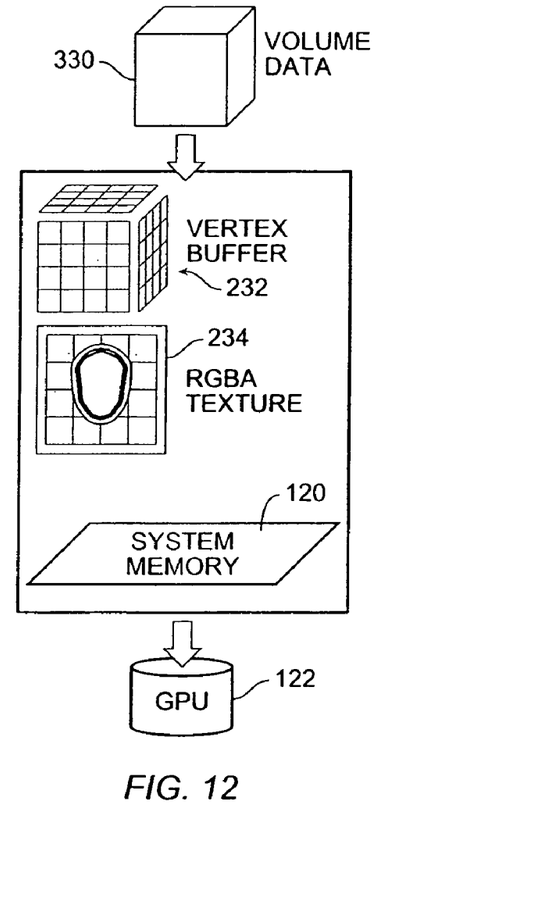
FIG. 12 is a depiction of a flow diagram of main volume rendering.

FIG. 12 illustrates the flow of the visibility computation from volume data 330 to a vertex buffer 232 to an RGBA texture view 234, all stored in system memory 120 and applied to a GPU 122

Figure 13:
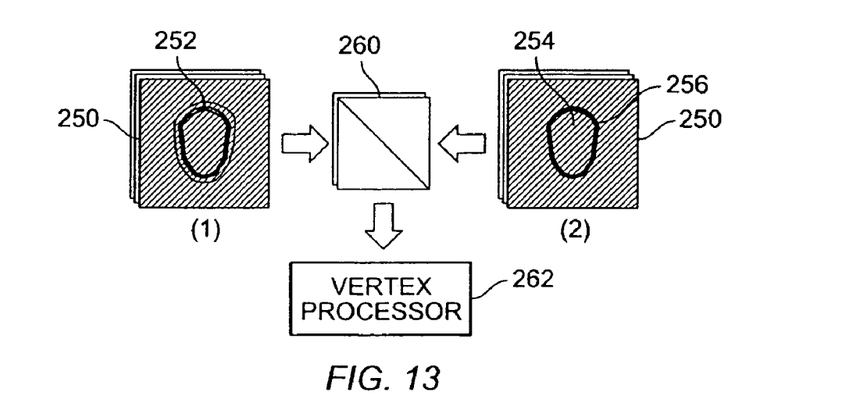
FIG. 13 is a depiction of the process of reduction of blocks.

1) Static Block Filtration: Volume data is commonly stored as a deck of 2D images, or a block of 3D voxels. So as to preserve the completeness of the data, static unused signals are usually stored as well. As illustrated in FIG. 13, signals in a grey region 250 of an image slice 252 are stored merely for preserving data completeness. In addition, a transparent region produced in threshold operations or other data manipulation may be observed. An inner grey region 254 of an image slice 256 demonstrates a region in which non-contributing signals are generated through threshold operations. Since these signals can result in a huge amount of non-contributing blocks which would exhaust the fragment processor, all such signals are to be filtered out to generate resultant vertex components 260 before passing to a vertex processor 262.

Referring to FIG. 14, to filter out unused static signals, color entries, in terms of RGBA values, of signals to be rejected are first identified from an original image. A filter set is used to store these color entries. The filter set can contain more than a single color entry. For one particular stack of slices, blocks 261 are filtered according to the filter set. A block is identified as to-be-filtered if and only if the whole block contains merely color entries from the filter set. This filtration is performed three times for each stack of axis-aligned grids of blocks. In this example, a raw slice is enlarged and divided into 64 blocks of block. Assuming the filter set is to eliminate all "black in color" entries; those outermost "black" blocks are identified as to-be-filtered according to this particular filter set.

Once the blocks of fragments are filtered out, there will remain a set of remaining blocks, namely, statically filtrated blocks 270. The indices of statically filtrated blocks are stored in a list, which is in a vertex array format. Vertex coordinates and texture coordinates of blocks are stored in the vertex array as well.

Figure 15:
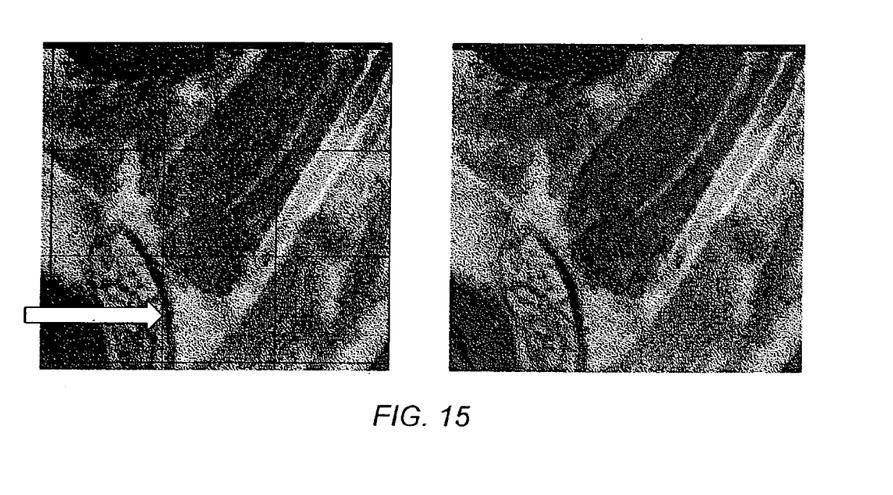
FIG. 15 illustrates of a gutter effect.

For a set of blocks on one single slice, if they are rendered individually, a gutter-pattern effect would appear on the edges of every block during rendering (FIG. 15). This is due to the projection of two adjacent blocks onto one single pixel. To solve this problem, a hardware-accelerated feature of the graphics board is deployed. Texture clamping is used to compile one particular set of blocks originated from the same texture slice. By means of texture clamping, blocks on the same slice will be rendered as a whole in producing the images, and the final screen image can be gutter-free.

Figure 16:
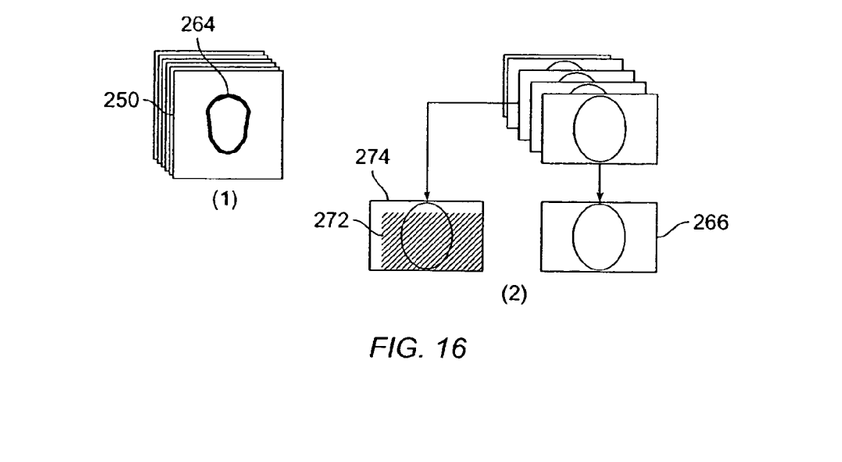
FIG. 16 is a depiction of the process of masking of blocks.

2) Dynamic Block Filtration:

In a dynamic block filtration step, it is necessary to further filter any unused blocks generated due to run-time translation/rotation/scaling of the volume dataset. Dynamic unused signals refer to the non-visible signals due to occlusion in interactive viewing. In particular, these signals can either be in a region clipped by user-defined clip-planes or hidden by the preceding deck of slices. These signals cannot be removed in traditional static volume rendering pipeline, since these data are essential for depth testing. However, in fragment rendering, depth information is no longer needed, and the clipped/occluded blocks can be filtered before this rendering step. In FIG. 16, a grey region 272 of a slice shows the occluded region while the remaining region 274 is to be retained. These dynamic unused signals are filtered by making use of the information computed in the virtual rendering pass.

Based on the current translational and rotational status of the volume dataset, the corresponding axis-aligned stack of slices out of the three choices is selected. The dynamic block filtration is based on filtrate-blocks retained from the static block filtration phase.

In the virtual rendering pass, the visible blocks' ID is stored in the central main memory. This information is read and all those to-be-filtered blocks are marked. Reminding filtrate-blocks are passed to the next step.

Having identified the static and dynamic non-contributing signal region, the blocks can be processed. Filtrate-blocks obtained in static and dynamic block filtration are used to render final images. The slices, in terms of blocks, are sorted according to the depth information. Blocks are rasterized, and transferred to the fragment processor.

The choice of the dimension of blocks depends on the hardware resource. In general, smaller blocks facilitate the effectiveness of the filtration to lower the polygon stream being passed to fragment processor. However, smaller blocks imply that more blocks must be used in dynamic block filtration. Various hardware configurations would have different optimum slice-to-block ratio.

A system can be implemented for interactive rendering of high quality volume data. This system comprises of a slice reader and an interactive renderer. The slice reader loads a deck of texture slices for pre-processing; the renderer implements the hardware-accelerated block filtration to provide interactive rendering of large volume dataset. A user interface accepts user control to translate, rotate, scale, and to specify the clipping-plane. According to the user's interaction, the system input all information to the renderer.

Appendix A is a pseudo source code listing of a computer program according aspects of to the invention suited to operation on a conventional personal computer with one or more graphics processing units.

The invention has been explained with reference to specific embodiments. Other embodiments will be evident to those of ordinary skill in the art. It is therefore not intended that this invention be limited, except as indicated by the appended claims.

APPENDIX A

```
/////////////////////
/* Main thread */
/////////////////////
Enter program event loop;
/* get user input */
Grab mouse and keyboard input;
if (not quitting program by user)
        Compute translation, rotation, scaling and plane-clipping based
            on mouse and keyboard input values;
        Obtain user-defined threshold operations;
        Compute transformation matrix of translation, rotation and
scaling;
        /* write data into CPU buffer */
        Lock CPU buffer;
        Write projection matrix into CPU buffer;
        Write transformation matrix into CPU buffer;
        Write clipping plane parameters into CPU buffer;
        Write threshold operations into CPU buffer;
        Unlock CPU buffer;
        Call PREPROCESSING procedure;
        Run Main Rendering Thread;
        p = the number of side graphics slot;
        Separate the grids of blocks into p sets;
        Distribute p Virtual Rendering threads into different graphics
            processing units installed on side slot with different sets of
            grids;
        Wait for all Virtual Rendering threads to finish;
        Merge up all visibility information within the CPU buffer;
        Wake up Main Rendering Thread to perform dynamic block
            filtration;
else
        Exit program event loop;
end if;
///////////////////////////////
/*Data Pre-processing*/
///////////////////////////////
/*slice reading*/
Read volume data in terms of 2D slices into system memory;
/*preprocessing (remove noise)*/
for every slice in original image slices
        remove noise from slice;
/*reconstruct 3D texture map*/
Setup 3D texture mapping parameters;
Generate and Load 3D texture map GPU buffer resided in the texture
memory;
/*axis-aligned stack generation*/
Lock GPU buffer;
Copy 3D texture map from GPU buffer;
Unlock GPU buffer;
By applying tri-linear interpolation on the 3D texture map:
        Construct a stack of X-axis-aligned 3D-textured slices;
        Construct a stack of Y-axis-aligned 3D-textured slices;
        Construct a stack of Z-axis-aligned 3D-textured slices;
/* slice rescaling */
for every slices in the X-axis-aligned stack
    if (y-dimension of slice is not of power of 2)
        Enlarge y-dimension to (2 to the power of b) by clamping edge;
    end if;
    if (z-dimension of slice is not of power of 2)
        Enlarge z-dimension to (2 to the power of c) by clamping edge;
    end if;
end for;
for every slices in the Y-axis-aligned stack
    if (x-dimension of slice is not of power of 2)
        Enlarge x-dimension to (2 to the power of a) by clamping edge;
    end if;
    if (z-dimension of slice is not of power of 2)
```

APPENDIX A-continued

```
        Enlarge z-dimension to (2 to the power of c) by clamping edge;
    end if;
end for;
for every slices in the Z-axis-aligned stack
    if (y-dimension of slice is not of power of 2)
        Enlarge y-dimension to (2 to the power of b) by clamping edge;
    end if;
    if (x-dimension of slice is not of power of 2)
        Enlarge x-dimension to (2 to the power of a) by clamping edge;
    end if;
end for;
/* slice subdivision */
select a positive integer n where k:n is an integer and k =
min (a, b, c);
for every slices in the X-axis-aligned stack
        Subdivide slice into b/n times c/n blocks;
for every slices in the Y-axis-aligned stack
        Subdivide slice into a/n times c/n blocks;
for every slices in the Z-axis-aligned stack
        Subdivide slice into a/n times b/n blocks;
Label a grid index for every block;
Write vertex coordinates, and texture coordinates of blocks in a
vertex array;
/////////////////////////////////////////
/*main rendering thread */
/////////////////////////////////////////
/* initialize data */
Read information on grids of blocks;
Initialize vertex shader and fragment shader;
/* retrieve data from CPU_buffer */
Lock CPU buffer;
Read projection matrix into CPU buffer;
Read transformation matrix from CPU buffer;
Read clipping plane parameters from CPU buffer;
Read any threshold operations from CPU buffer;
Read visibility information in terms of visible block IDs from
CPU buffer;
Unlock CPU buffer;
/* static block filtration */
if (run first time or with changes in filter set)
        Setup/modify the filter set according to user-defined
        threshold operations;
        for each block in all 3 axis-aligned grids of blocks
            if (any voxel value within the block not in filter set)
                set block as statically filtrated;
            else
                set block as to-be-filtered;
            end if;
        end for;
        Write vertex and texture information of filtrated blocks
        into a 2D vertex array;
endif;
Compute deviation of view vector and orientational status;
Selecting corresponding axis-aligned stack according to the
deviation;
Wait for the virtual rendering thread to finish computation;
/* dynamic block filtration */
if (run first time or with transformational changes)
        From the statically filtrated blocks, filter out non-
        viewable blocks based on obtained visible block IDs;
        Mark up remaining blocks as final filtrate-blocks;
endif;
Sort filtrate-blocks in back-to-front order;
Write vertex coordinates and texture coordinates of filtrate-
blocks into a vertex array;
        /* final rendering */
        Set screen background as (0, 0, 0, 0);
        Set up transformation matrix;
        Enable texture mapping in the rendering pipeline;
        Setup texture mapping parameters in the rendering pipeline;
        Enable texture clamping in the rendering pipeline;
        Retrieve vertex array storing filtrated blocks
        for each block in the vertex array
            Get vertex coordinates of block;
            Get texture coordinates of block;
            Draw square block onto the screen;
        end for;
/////////////////////////////////////////
/*virtual rendering thread */
```

APPENDIX A-continued

```
/////////////////////////////////////////
/* initialize data */
Read information on set of grids;
Initialize vertex shader and fragment shader;
/* item buffer rendering */
Set virtual screen background to (0, 0, 0, 0);
Lock CPU buffer;
Read projection matrix into CPU buffer;
Read transformation matrix from CPU buffer;
Read clipping plane parameters from CPU buffer;
Unlock CPU buffer;
for every block in grids of blocks
        Set vertex buffer of block based on vertex coordinates;
        Set color texture of block based on its grid index by:
            In one particular voxel:
                if (32-bit color format)
                    R-value = X index (8-bit);
                    G-value = Y index (8-bit);
                    B-value = Z index (8-bit);
                    A-value = dummy value (8-bit);
                else if (16-bit color format)
                    R-value = X index (5-bit);
                    G-value = Y index (6-bit);
                    B-value = Z index (5-bit);
                end if;
end for;
Write vertex and texture information into a vertex array;
Set up transformation matrix;
Compute deviation of view vector and orientational status;
Selecting corresponding axis-aligned grids of blocks according to
the deviation;
Retrieve vertex array storing blocks
for each block in the vertex array
        Get vertex coordinates of block;
        Get texture coordinates of block;
        Draw square block onto the virtual screen;
end for;
/* write data to CPU buffer */
Lock CPU buffer;
Write visibility information (in form of visible block IDs) into CPU
buffer;
Unlock CPU buffer;
```

What is claimed is:

1. A system for interactive rendering of substantial amounts of high quality volume data for a visual display comprising:
   a slice reader operative to load a stack of texture slices for pre-processing;
   a user interface operative to accept user control input to translate, to rotate, to scale, and to specify a clipping-plane of said volume data;
   a virtual rendering item buffer; and
   a rendering subsystem operative with hardware-accelerated block filtration to provide interactive rendering of the large volume dataset, said hardware-accelerated block filtration adapted to operate in accordance with one or more block IDs generated by the virtual rendering item buffer so as to provide interactive rendering of a largest volume dataset.

2. A graphics processing system for interactive volume rendering of substantial amounts of volume data into displayable images on a display of a personal computer, said personal computer having at least one graphics processing unit, comprising:
   a pre-processor for pre-processing each slice of the stack of slices prior to manipulation to remove unused signals derived from volume picture elements from image texture of each said slice;
   a volume data reconstructer for reconstructing a 3-dimensional texture map of said volume data from said 2-dimensional slices;

a data segmenter for segmenting said 3-dimensional texture map into 3 stacks of 2-dimensional-textured axis-aligned slices;

a rescaler for rescaling said image texture so that its edge dimension is of an integer power of two to yield 2-dimensional slices;

a 2-dimensional data subdivider for subdividing each said 2-dimensional slice into smaller texture blocks;

interface for receiving and requesting response to interactive input designating view and size of image display performed on the volume data;

a processing engine for carrying out selected transformations, including at least translation, rotation scaling and plane-clipping, on said texture blocks;

a rendering engine for performing a two-pass rendering process on said blocks comprising a virtual rendering pass in order to filter out view-dependent unused blocks, and a main rendering pass in order to obtain processed blocks for further filtration; and a block-based fragment filter operative on the processed blocks to obtain image elements suited for display as textured blocks and to render final images.

3. A method for interactive volume rendering of substantial amounts of volume data in form of a stack of 2-dimensional slices into displayable images on a display of a personal computer, said personal computer having at least one graphics processing unit, comprising:

reconstructing a 3-dimensional texture map of said volume data from the 2-dimensional slices;

segmenting said 3-dimensional texture map into 3 stacks of 3-dimensional-textured slices;

rescaling said 3-dimensional-textured slices so that each slice edge dimension is of an integer power of two to yield 2-dimensional rescaled slices;

subdividing each said 2-dimensional rescaled slice into grid of blocks with corresponding depth and texture coordinate information;

in response to interactive input designating view and size of image display of said volume data, carrying out selected transformations, including at least translation, rotation scaling and interactive plane-clipping, on said grids of blocks, said interactive plane clipping including the steps of:
  applying axis-aligned plane clipping; and
  applying arbitrarily aligned plane clipping;

performing a two-pass rendering process on said grids of blocks comprising a virtual rendering pass in order to compute information of the view-dependent unused blocks, and a main rendering pass in order to obtain processed blocks for further filtration; and applying block-based fragment filtration to the processed blocks to obtain image elements suited for display and to render a final image.

4. The method according to claim 3 wherein the dimension of each said 3-dimensional-textured slice is rescaled to a power of two and for a, b and c as positive integers, said rescaling step further comprises:
  rescaling the dimension of every x-axis-aligned slice to $2^b \times 2^c$
  rescaling the dimension of every y-axis-aligned slice to $2^a \times 2^c$; and
  rescaling the dimension of every z-axis-aligned slice to $2^a \times 2^b$.

5. The method according to claim 4 wherein said subdividing step comprises:
  dividing each said 2-dimensional rescaled slice into a grid of regular square blocks of smaller texture, the dimension of each said block being $2^n \times 2^n$, while associating a grid index with each said block, where n<a, n<b, and n<c; and
  selecting n as a ratio k:n, where n is an integer and k=min(a, b, c).

6. The method according to claim 5 further including the step of storing said grid index as vertex coordinates of corners and corresponding clipped texture coordinates of said square blocks in vertex arrays, each said vertex array storing all information of only an individual block.

7. The method according to claim 3 wherein
  said virtual rendering pass includes rendering said volume data to compute view dependent visibility information, and storing said visibility information in buffer space allocated to main system memory; wherein
  said main rendering pass includes static block filtration and dynamic block filtration while rendering said final image;
  storing current rendering status, including at least translation, rotation, scaling and plane-clipping, in the system memory; and
  sharing said current rendering status between said main rendering pass and said virtual rendering pass.

8. The method according to claim 7 wherein
  a main rendering thread is allocated to a single main graphics slot, and a at least one virtual rendering thread is allocated to side graphics slots.

9. The method according to claim 3 wherein said main rendering thread and at least one said virtual rendering thread are distributed among a plurality of graphics processing units.

10. The method according to claim 7 wherein said virtual volume rendering step includes:
  selecting a corresponding stack out of three said axis-aligned grids of blocks according to the current translational and rotational status of said volume data;
  retrieving vertex information stored in said vertex arrays;
  storing identity of every block within said grid of blocks as color texture;
  applying axis-aligned or user-defined clipping plane onto the rendering procedure;
  rendering combined texture to a virtual screen buffer in order to compute information of any non-viewable blocks in preparation for transferring the identity of viewable blocks of the virtual screen buffer to the system memory.

11. The method according to claim 10 wherein the block identity storing step comprises:
  identifying image format used for storing block IDs;
  determining spatial identity of every block in terms of position entry, the spatial identity being integers ascending from zero; and
  mapping every spatial identity to a color value.

12. The method according to claim 10 wherein the combined texture rendering step is a multi-GPU process using a plurality of vertex shaders and fragment shaders that combine color texture, alpha texture and vertex buffer in said virtual rendering.

13. The method according to claim 12 wherein the multi-GPU process includes:
  dividing said grids of blocks into different sets according an available number of side graphics slots;
  rendering different sets of slices to the virtual screen, in form of a virtually rendered item buffer, individually;
  merging all visibility information; and
  copying the resultant visibility information to system memory.

14. The method according to claim 7 wherein said main rendering pass step comprises:
- performing static block filtration to filter out view independent blocks including merely non-contributing signal; and
- performing dynamic block filtration to filter out view dependent blocks due to occlusion.

15. The method according to claim 14 wherein, during the static block filtration step,
- processing each block in three said axis-aligned grids of blocks to reduce static unused signals derived from volume picture elements, including:
- defining the non-contributing signal as a set of specific color entries, namely a filter set;
- performing the static block filtration on each block in said grid of blocks to filter out the non-contributing signal from rasterization according to said filter set;
- identifying blocks as to-be-removed if and only if the whole block is filled only with colors from said filter set; and
- recording indices of all remaining blocks, namely statically filtrated blocks.

16. The method according to claim 7 wherein the static block filtration step includes:
- processing each of three said axis-aligned grids of blocks separately in three passes.

17. The method according to claim 7 wherein the dynamic block filtration step includes:
- selecting corresponding stacks out of the three said axis-aligned grids of blocks according to current translational and rotational status of said volume data;
- retrieving vertex information of said statically filtrated blocks;
- reading visibility information and a current projection matrix;
- determining filtrate-blocks using the visibility information;
- directing a vertex buffer of said filtrate-blocks to the vertex processor for rasterization and processed textures coordinates to the fragment processor; and
- rendering the final image by said vertex buffer with said 3-dimensional texture map.

18. The method according to claim 7 wherein the dynamic block filtration step includes:
- using filtrate-blocks determined from the visibility information obtained from the system memory;
- sorting said filtrate-blocks according to depth information to obtain sorted filtrate blocks; and
- rendering the sorted filtrate-blocks in back-to-front order.

* * * * *